(12) United States Patent
Nagate et al.

(10) Patent No.: US 6,684,925 B2
(45) Date of Patent: Feb. 3, 2004

(54) LAMINATOR AND LAMINATING METHOD FOR LAMINATION TO SUBSTRATE

(75) Inventors: Hiroshi Nagate, Shizuoka (JP); Kazuyoshi Suehara, Kanagawa (JP); Shinji Uematsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 101 days.

(21) Appl. No.: 09/987,329

(22) Filed: Nov. 14, 2001

(65) Prior Publication Data

US 2002/0056512 A1 May 16, 2002

(30) Foreign Application Priority Data

Nov. 15, 2000  (JP) ........................................ 2000-347580

(51) Int. Cl.$^7$ ..................... B32B 31/20; B32B 31/18; B32B 31/12; G03C 1/74
(52) U.S. Cl. ..................... 156/540; 156/542; 156/558; 156/583.1; 156/498; 156/510; 156/521; 156/230; 156/257
(58) Field of Search ................................. 156/230, 231, 156/238, 240, 247, 289, 272.2, 540, 542, 558, 580, 581, 583.3, 250, 268, 256, 257, 498, 510, 521

(56) References Cited

U.S. PATENT DOCUMENTS 2,559,649 A * 7/1951 Little et al. ................ 156/231
4,495,014 A * 1/1985 Gebrian et al. ............. 156/80

FOREIGN PATENT DOCUMENTS

JP  A 2000-181080  6/2000

* cited by examiner

Primary Examiner—J. A. Lorengo
(74) Attorney, Agent, or Firm—Young & Thompson

(57) ABSTRACT

A laminator for lamination to a substrate by use of continuous laminated material is provided. The laminated material includes a support, and a photosensitive transfer layer overlaid on the support. A heat/pressure roller attaches the laminated material to the substrate with heat and pressure with the transfer layer opposed to the substrate. A cooler cools the substrate with the laminated material. A peeler peels the support from the transfer layer on the substrate from the cooler, to transfer the transfer layer to the substrate.

14 Claims, 4 Drawing Sheets

LAMINATOR AND LAMINATING METHOD FOR LAMINATION TO SUBSTRATE

BACKGROUND OF THE INVENTION

1. Field of the Invention

The present invention relates to a laminator and laminating method for lamination to a substrate. More particularly, the present invention relates to a laminator and laminating method for lamination to a substrate in which a product can be obtained efficiently and failure can be prevented reliably.

2. Description Related to the Prior Art

A color filter for a liquid crystal display (LCD) panel is produced by photo lithography, in which a laminated sheet or plate having a photosensitive layer is exposed and developed for each of the three colors. To produce the laminated sheet or plate, a laminator is used for laminating or transferring a transfer layer to a glass substrate. At first, laminated material is prepared, including a support and the transfer layer overlaid thereon. The laminated material is a material of a shape of sheet or film. The support is a base film and has transmittance. The transfer layer is formed from photosensitive solution of dispersion of pigment. This producing method is advantageous over the spinner method, as no application of a coating to the glass substrate is required. There is no problem of projection failure or blank failure which would be caused in the spinner method.

In addition to the color filter for the LCD panel, the laminator and laminating method are used for producing a laminated sheet or plate in a plasma display panel, printed circuit board and the like.

The laminated material includes the support, the transfer layer, and a cover film overlaid on one another, and is continuous and wound in a roll form. For lamination to the glass substrate by transfer, the laminated material is unwound, from which the over film is peeled. Then the transfer layer is fitted on one surface of the glass substrate, which is passed between two heat/pressure rollers. Thus, the laminated material is attached to the glass substrate with heat and pressure.

This is a dry laminate type of method of lamination. Examples of dry laminate types include a method in which the laminated material is cut by unit length of the glass substrate, and then attached to the glass substrate, and a method in which a plurality of the glass substrates are successively fed, the laminated material is continuously attached to surfaces of the glass substrates, and then the laminated material is cut in each position between a rear end of one of the glass substrates and a front end of a succeeding one of the glass substrates.

In any of the above methods, the glass substrates with the laminated material must be inserted in a substrate cassette or a reservoir, and cooled naturally under a clean environment before the support is peeled. It is necessary to set a buffer zone for containing the glass substrates and a peeler device for the support. Also, a feeder is required to feed the glass substrates to the buffer zone. Those elements cause complication of the construction, to lower efficiency in the production. Furthermore, establishment of the clean environment absolutely requires spaces for setting the buffer zone and the peeler device in a clean room. The equipment for the production becomes very costly. Also, the clean room should be large itself, to increase a running cost for the production.

Another problem arises in the method of cutting the laminated material into portions associated with each of the glass substrates. Bits or dust is likely to occur by the cutting operation, and sticks on the glass substrates to cause failure in the product.

SUMMARY OF THE INVENTION

In view of the foregoing problems, an object of the present invention is to provide a laminator and laminating method for lamination to a substrate in which a product can be obtained efficiently and failure can be prevented reliably.

In order to achieve the above and other objects and advantages of this invention, a laminator for lamination to a substrate by use of continuous laminated material is provided, the laminated material including a support, and a transfer layer overlaid on the support. A heat/pressure roller attaches the laminated material to the substrate with heat and pressure with the transfer layer opposed to the substrate. A cooler cools the substrate with the laminated material. A peeler peels the support from the transfer layer on the substrate from the cooler, to transfer the transfer layer to the substrate.

In a preferred embodiment, the transfer layer is photosensitive.

The cooler includes a cooling fan or blower for blowing cooling gas over the substrate after attachment of the laminated material.

The peeler transfers the transfer layer by separating the support along a predetermined peeling line from the transfer layer, and the peeling line is in a direction perpendicular to feeding of the substrate, or has an inclination to the perpendicular direction.

Furthermore, a half cutter is disposed upstream from the heat/pressure roller with reference to feeding of the laminated material, for cutting the transfer layer in the laminated material at a pitch associated with substantially a size of the substrate with the support uncut.

Furthermore, a supplier moves and supplies the substrate to the heat/pressure roller. A substrate/material feeder moves the substrate and the laminated material from the heat/pressure roller to the peeler while the cooler operates. An ejector moves and ejects the substrate from the peeler after laminating the transfer layer.

The peeler includes a guide roller being rotatable, having a rotational axis extending in parallel with the peeling line, for contacting the support. A winder winds the support bent on the guide roller away from the substrate, to separate the support from the transfer layer.

Each of the supplier and the ejector includes an advancing mechanism, operable in contact with the substrate at least partially, for advancing the substrate. A flotation blower blows gas over a lower surface of the substrate advanced by the advancing mechanism, to prevent the substrate on the advancing mechanism from flexing downwards.

The advancing mechanism includes plural advancing rollers, arranged in a direction of advancing the substrate, having rotational axes that are substantially parallel with one another, for being actuated in contact with the lower surface of the substrate.

The substrate/material feeder supports the laminated material and the substrate upwards in feeding, and the cooler blows the gas over an upper surface of the substrate.

Furthermore, a withdrawing cassette withdraws the substrate from the ejector after laminating the transfer layer.

The laminated material is oriented to direct the transfer layer upwards, and is attached to the lower surface of the substrate.

The ejector further includes a transfer mechanism for transferring the substrate from the advancing mechanism to the withdrawing cassette. The advancing mechanism and the transfer mechanism contact lateral edge portions of the lower surface of the substrate, the upper surface, or lateral surfaces or an end surface of the substrate.

Furthermore, a preheater preheats the substrate while the substrate is moved by the supplier.

Therefore, a product can be obtained efficiently, because the cooler operates quickly to cool the substrate between stations of the heat/pressure roller and the peeler.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
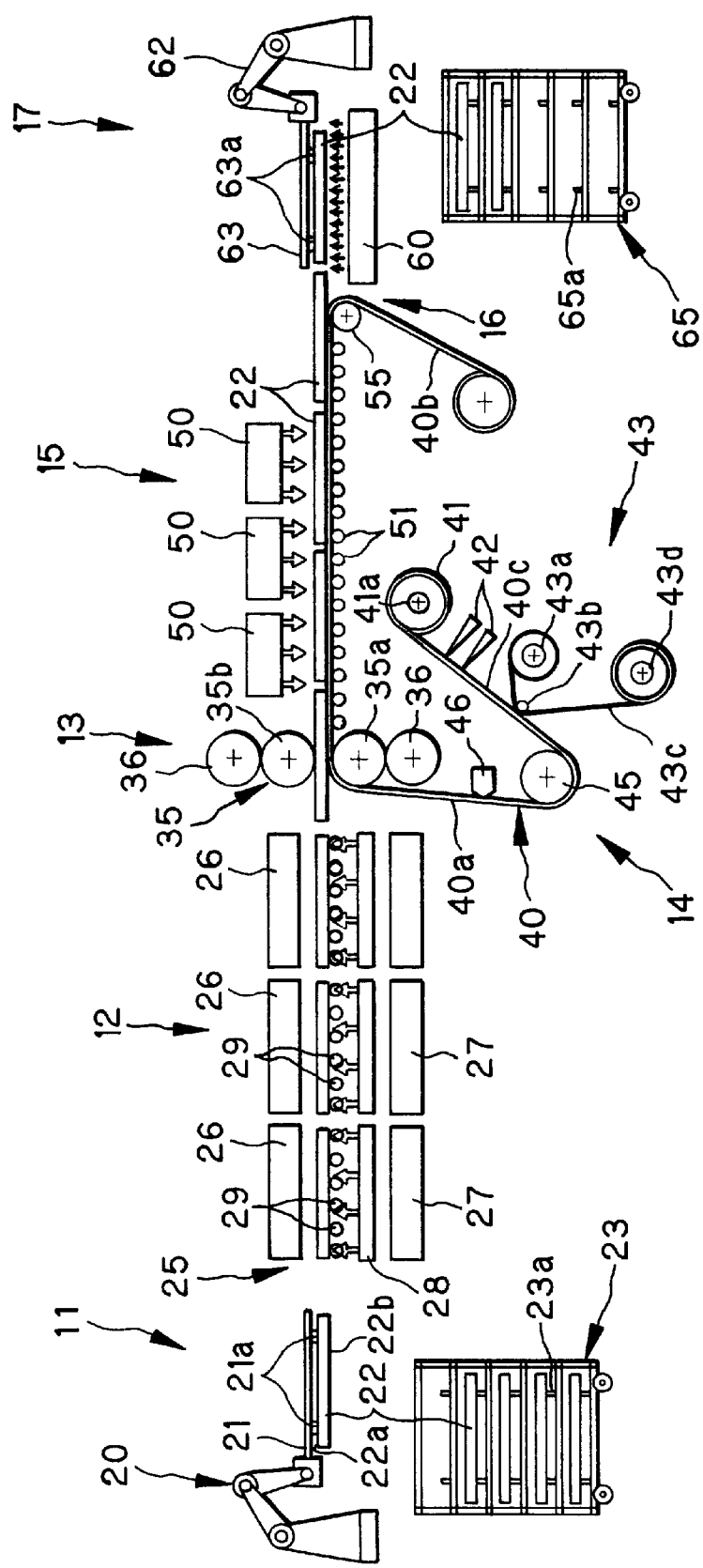
FIG. 1 is a side elevation illustrating a laminator.

In FIG. 1, a laminator of the present invention is depicted. The laminator or a layer transferring device includes a supply transfer mechanism 11, a preheater 12, an attacher unit 13, a laminated material supply unit 14, a cooler 15 having a cooling fan or blower, a peeler 16, and an ejector 17.

The supply transfer mechanism 11 includes a supply robot hand 20 of an articulated robot type. A hand body 21 of the supply robot hand 20 includes suction pads 21a. A glass substrate 22 has a back surface 22a, which is sucked or retained by the suction pads 21a, which keep the glass substrate 22 captured on the hand body 21. The glass substrate 22 also has a transfer receiving surface 22b which is reverse to the back surface 22a. A supply cassette 23 stores the glass substrate 22. The supply robot hand 20 takes the glass substrate 22 out of the supply cassette 23, and turns the glass substrate 22 by half a rotation to direct the transfer receiving surface 22b downwards, before the supply robot hand 20 sends the glass substrate 22 to the preheater 12. The supply cassette 23 keeps numerous glass substrates 22 oriented horizontally. Furthermore, plural support posts 23a are included in the supply cassette 23 for supporting the glass substrate 22. It is to be noted that, instead of the suction pads 21a, any other mechanism can be used in a manner to contact only a back surface of the glass substrate 22 directed upwards, or contact a portion of the lateral edges of the glass substrate 22. Furthermore, a suction device may be used in combination with a vacuum pump or the like for exhaustion of air. The suction device can operate for suction of the glass substrate 22 by forced exhaustion.

Figure 2:
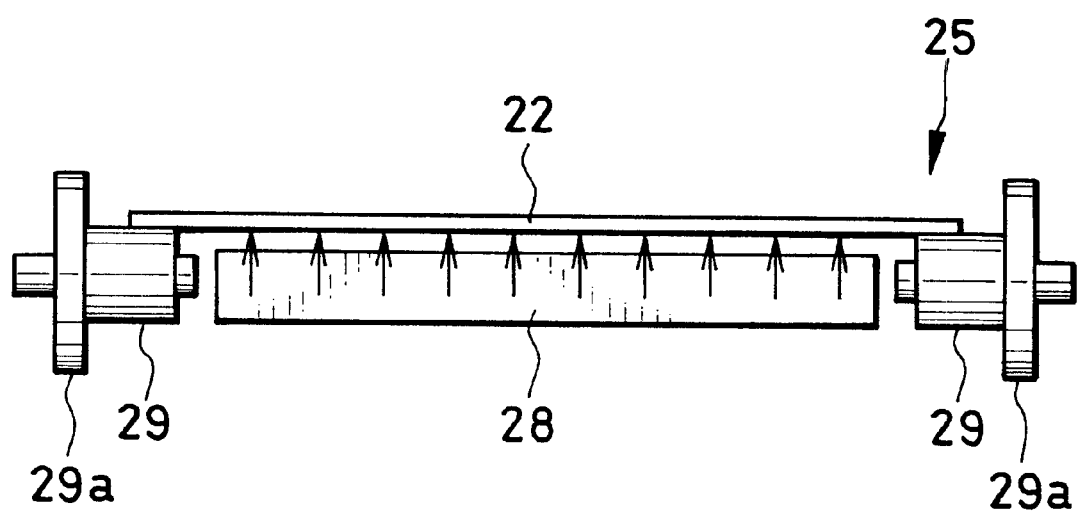
FIG. 2 is an elevation illustrating a supplier for supplying a glass substrate.

The preheater 12 is constituted by a supplier 25 and heaters 26 and 27. In FIG. 2, the supplier 25 includes a flotation blower 28 and advancing rollers 29 as advancing mechanism. The flotation blower 28 in a plate shape is opposed to a lower surface of the glass substrate 22, and blows clean air over the glass substrate 22 to float the glass substrate 22.

The advancing rollers 29 contact a lower surface of portions of lateral edges of the glass substrate 22 being floated, and rotate to feed the glass substrate 22 toward the attacher unit 13. The advancing rollers 29 have a flange-formed shape. A flange portion 29a of the advancing rollers 29 operates as a guide of the glass substrate 22 to position the glass substrate 22 in the width direction. The advancing rollers 29 are positioned away from a path of insertion of the hand body 21 of the supply robot hand 20, and do not interfere with the hand body 21. Note that it is possible to use nip rollers, combined with the advancing rollers 29, for squeezing the glass substrate 22. Furthermore, it is possible instead of the advancing rollers 29 to feed the glass substrate 22 by means of a conveyor belt, or air directed in an oblique direction for blowing the glass substrate 22. Instead of the advancing rollers 29 in the flanged shape, a guide roller may be used, and may rotate in contact with the lateral edge portions of the glass substrate 22. Furthermore, a feed roller may be disposed to contact an upper surface of the glass substrate 22, to feed the glass substrate 22 in combination with sufficiently high pressure of flotation of the glass substrate 22 with air.

The heaters 26 and 27 are so disposed that a path of the glass substrate 22 in the supplier 25 is disposed between those, to heat the glass substrate 22 at a temperature of 50–110 degrees centigrade. Examples of the heaters 26 and 27 are a far infrared ray heater, Nichrome wire heater, hot air heater and the like. The glass substrate 22 preheated by the preheater 12 is sent to the attacher unit 13 by the advancing rollers 29.

The attacher unit 13 is constituted by a heat/pressure roller set 35 and a backup roller 36. The heat/pressure roller set 35 includes lower and upper heat/pressure rollers 35a and 35b. A heater is incorporated in each of the heat/pressure rollers 35a and 35b. The heat/pressure roller set 35 squeezes a laminated material 40 and the glass substrate 22 together, to attach the laminated material 40 to the glass substrate 22 by application of heat and pressure. The backup roller 36 is disposed to rotate in contact with each of the heat/pressure rollers 35a and 35b, and regularizes pressurization by suppressing flexure of the heat/pressure rollers 35a and 35b. Note that it is possible in the present invention to construct the heat/pressure rollers 35a and 35b without using the backup roller 36.

Figure 3:
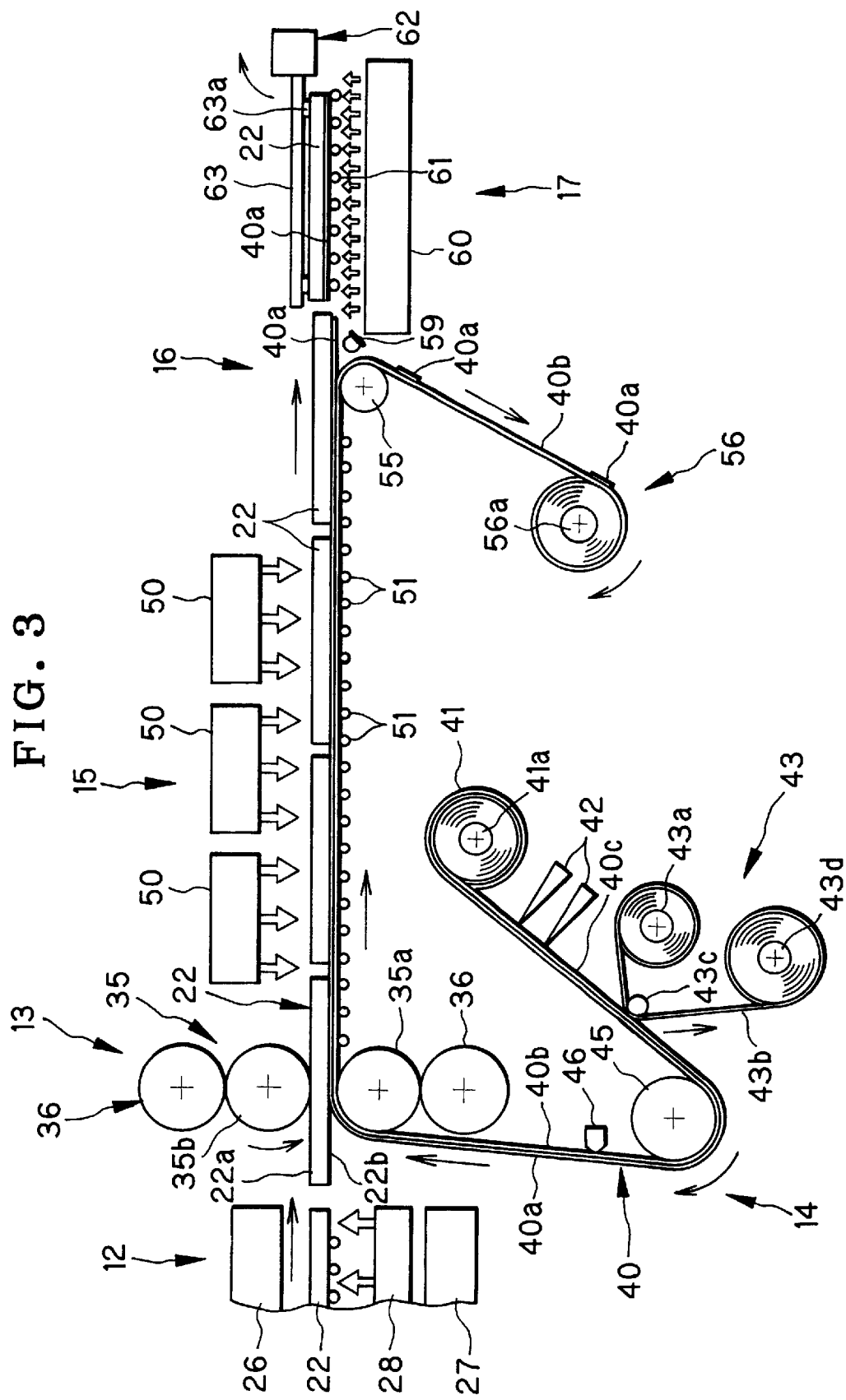
FIG. 3 is a side elevation illustrating a preheater, an attacher unit, a laminated material supply unit, a cooler, a peeler, and an ejector in the laminator.

In FIG. 3, the laminated material supply unit 14 is constituted by a roll shaft 41a, a half cutter 42, a cover film peeler 43, a back tension roller 45, a tension sensor 46 and the like. A laminated material roll 41 of the laminated material 40 is supported by the roll shaft 41a. The laminated material 40 includes a continuous support 40b or film, a transfer layer, or photosensitive layer or film 40a, and a cover film 40c. The laminated material supply unit 14 peels the cover film 40c from the laminated material roll 41, and supplies the heat/pressure roller set 35 with the laminated material 40 oriented to direct the transfer layer 40a upwards. There is an edge position control mechanism (not shown) in the vicinity of the roll shaft 41a. The edge position control mechanism detects the positions of the lateral edges of the laminated material 40, to correct them automatically. The laminated material 40 is adjusted in positioning with reference to the glass substrate 22 in the width direction crosswise to the feeding.

The laminated material 40 also includes an auxiliary layer (not shown), an intermediate layer (not shown) and the like, which are disposed between the transfer layer 40a and the support 40b. The cover film 40c is overlaid on the transfer layer 40a. A layer of antistatic agent is overlaid on a back surface of the support 40b.

The half cutter 42 cuts the laminated material 40 at a halfway depth and at a size corresponding to the length of the glass substrate 22. The halfway cutting keeps the support 40b uncut unlike the cover film 40c and the transfer layer 40a.

The cover film peeler 43 peels the halfway cut portion of the cover film 40c from the laminated material 40 to be attached to the glass substrate 22. The cover film peeler 43 includes pressure-sensitive adhesive tape 43b, a pressure roller 43c and a tape winder shaft 43d. The adhesive tape 43b is unwound from an adhesive tape roll 43a, and is pressed against the cover film 40c. As the adhesive tape 43b is drawn and wound by the tape winder shaft 43d, the cover film 40c is removed by adhesion to the adhesive tape 43b, and wound about the tape winder shaft 43d together with the adhesive tape 43b. Small separate segments of the cover film 40c remaining between the plural glass substrates 22 are kept in the laminated material 40 without being peeled.

The attacher unit 13 actuates a substrate feeding member in response to passage of the halfway cut line. The transfer layer 40a of the laminated material 40 is attached to the glass substrate 22 with the halfway cut line positioned at the glass substrate 22. The support 40b is advanced to a downstream position from the heat/pressure roller set 35 in a manner together with the glass substrate 22.

The cooler 15 includes a cooling air blowing board 50 and feed rollers 51. The feed rollers 51 operate as a substrate/material feeder. The cooling air blowing board 50 regularizes distribution of a flowing speed of the air. In the cooling air blowing board 50, there are formed punch holes with which the cooling air blowing board 50 has a proportion of openness of 8%. Cooling air having high cleanness is passed through the HEPA (high efficiency particulate air) filter, and passed through the punch holes to blow the glass substrate 22. To raise the efficiency in the cooling, the cooling air is caused to flow in outward directions crosswise to the feeding of the glass substrate 22. The glass substrate 22 is cooled down to the room temperature that is 30 degrees or lower. Time of passage of the glass substrate 22 at the cooler 15 is one minute or more, to cool the glass substrate 22 sufficiently.

In the present embodiment, the speed of advancing the substrate is 1.0 m/min during application of heat and pressure. The temperature of the cooling air to blow is 17 degrees centigrade. The flow rate of the air is 6 m/sec. However, those can be changed in association with changes in the thickness, size and the like of the glass substrate 22. The feed rollers 51 support the glass substrate 22 by contacting the support 40b of the laminated material 40, and sends the glass substrate 22 to the peeler 16. It is to be noted that the cooling air blowing board 50 can have a proportion of openness of 3–15%, the advancing speed of the glass substrate 22 can be 0.5–10 m/min, the temperature of the cooling air of the cooling air blowing board 50 can be 10–20 degrees centigrade, the flow rate of the air can be 3–12 m/sec.

The peeler 16 is constituted by a guide roller 55 and a support winder mechanism 56. The peeler 16 peels the support 40b from the glass substrate 22. A winder shaft 56a is provided in the support winder mechanism 56, and winds the support 40b in a roll form. The guide roller 55 preferably has a diameter of 30 mm or less, should have as small a diameter as possible in a range without problem in flexing the guide roller 55 even in application of tension in the peeling. The support 40b is contacted by the guide roller 55 at an angle of 90 degrees or more. However, the support 40b may be contacted by the guide roller 55 at an angle smaller than 90 degrees.

The guide roller 55 may be disposed to extend perpendicularly to the feeding of the glass substrate 22. However, it is much preferable to dispose the guide roller 55 with obliqueness relative to the advancing direction A of the glass substrate 22. See FIG. 4. The angle θ of the obliqueness can be determiend suitably. The angle should be 45 degrees or less in view of practical use. The transfer layer 40a has an advancing edge 40e. During separation of the transfer layer 40a from the support 40b, a portion being peeled is concentrated to one point in a direction crosswise to the feeding. The peeled point moves in the width direction of the glass substrate 22. Thus, the advancing edge 40e of the transfer layer 40a can be peeled neatly without roughness. In the present embodiment, a position of an axis of the guide roller 55 is unchanged. Alternatively, the guide roller 55 may be supported by a cantilever mechanism, and may be movable. The guide roller 55 may be caused to come near in an oblique direction to the feeding direction, swung to the perpendicular position, and then moved in parallel with the feeding, to peel the support 40b.

In FIG. 3, an air nozzle 59 is disposed in the vicinity of the guide roller 55. Ionization clean air is caused to flow out of the air nozzle 59, to eliminates static charge from the support 40b and the glass substrate 22. Thus, the support 40b and the glass substrate 22 are prevented from sticking of dust or other unwanted particles, to suppress lowering of quality of the product, in such a manner as partial missing of pixels. It is also possible to utilize other static eliminating method, such as soft X-ray technique, and the like.

The support winder mechanism 56 includes the winder shaft 56a and a winder motor (not shown) for rotating the winder shaft 56a. The winder motor is controlled for the torque by a controller (not shown). The control keeps tension of the support 40b invariable in positions downstream from the heat/pressure roller set 35, to prevent the support 40b from being loose. In the vicinity of the winder shaft 56a, the edge position control mechanism (not shown) is disposed. The edge position control mechanism detects positions of the lateral edges of the support 40b, and automatically corrects those positions. An offset state of the support 40b can be eliminated automatically with respect to the width direction of the photo film from the roll shaft 41a of the laminated material 40 to the winder shaft 56a.

The ejector 17 is disposed in a position downstream from the peeler 16 with reference to feeding of the glass substrate 22. The ejector 17 includes a flotation blower 60 having a plate-shaped top, advancing rollers 61 as advancing mechanism, and an ejection robot hand 62 as transfer mechanism. The flotation blower 60 has substantially the same construction as the flotation blower 28 in the preheater 12. The advancing rollers 61 contact a lower surface of portions of lateral edges of the glass substrate 22. Also, the glass substrate 22 may be advanced by means of a conveyor belt, or air directed in an oblique direction for blowing the glass substrate 22. Although the advancing rollers 61 are in the flanged shape for guiding, it is possible additionally to use guide rollers. Furthermore, a feed roller may be disposed to contact an upper surface of the glass substrate 22, to feed the glass substrate 22 in combination with sufficiently high pressure of flotation of the glass substrate 22.

The ejection robot hand 62 is constructed in a manner similar to the supply robot hand 20 in the supply transfer mechanism 11. A hand body 63 is included in the ejection robot hand 62 and extends to the top of the glass substrate 22. Suction pads 63a are disposed on a lower surface of the hand body 63. When the glass substrate 22 is advanced from the peeler 16, the suction pads 63a suck the top surface of the glass substrate 22. The hand body 63 removes the glass substrate 22 from the flotation blower 60. A withdrawing cassette 65 receives insertion of the glass substrate 22 being removed. Note that, in sucking the glass substrate 22 with the ejection robot hand 62, the contact between the transfer layer 40a on a lower side of the glass substrate 22 and the flotation blower 60 is reduced if air to float the glass substrate 22 is increased. This is effective in ensuring suction of the glass substrate 22 to the hand body 63 of the ejection robot hand 62.

The operation of the above embodiment is described now. In the supply transfer mechanism 11, the supply robot hand 20 sends the glass substrate 22 to the preheater 12. The supply robot hand 20 inserts the hand body 21 into the supply cassette 23. A lower surface of the glass substrate 22 is sucked to raise the glass substrate 22 away from a partition wall in the supply cassette 23. The supply cassette 23 has a storage chamber, in which the support posts 23a protrude upwards from each of plural partition walls. The support posts 23a keep the glass substrate 22 precisely horizontal. An upper face of the glass substrate 22 is a transfer receiving surface 22b, and is prevented from contacting the suction pads 21a or the support posts 23a.

The supply robot hand 20 turns over the glass substrate 22 being sucked, and inserts the glass substrate 22 into the preheater 12 in an orientation with the transfer receiving surface 22b directed downwards. Air is emanated upwards by the flotation blower 28 in the preheater 12, to float the glass substrate 22. The glass substrate 22 is preheated by the heaters 26 and 27, and sent to the attacher unit 13 by the advancing rollers 29.

In the attacher unit 13, the glass substrate 22 is supplied in synchronism with the movement of the halfway cut line of the transfer layer 40a of the laminated material 40. The halfway cut portion of the transfer layer 40a of the laminated material 40 is positioned on the glass substrate 22 and attached to the same by adhesion. To this end, the half cutter 42 in the laminated material supply unit 14 previously cuts the cover film 40c and the transfer layer 40a at each one portion for the glass substrate 22. Also, the cover film peeler 43 peels the cover film 40c at the one portion for the glass substrate 22. The laminated material 40 is positioned by the edge position control mechanism (not shown) with reference to the width direction crosswise to feeding. Also, the back tension roller 45 applies tension to the laminated material 40 at a predetermined level, to suppress occurrence of wrinkles or bubbles at the time of attaching the laminated material 40 to the glass substrate 22.

The glass substrate 22 after having passed the attacher unit 13 is cooled by clean cooling air from the cooler 15 down to a temperature of 30 degrees centigrade or lower. This forcible cooling makes it possible to peel the support 40b from the glass substrate 22 reliably without unevenness. Therefore, it is possible to transfer the transfer layer without natural cooling according to the prior art, according to which the glass substrate 22 with the laminated material 40 would be contained in a substrate cassette or the like.

Figure 4:
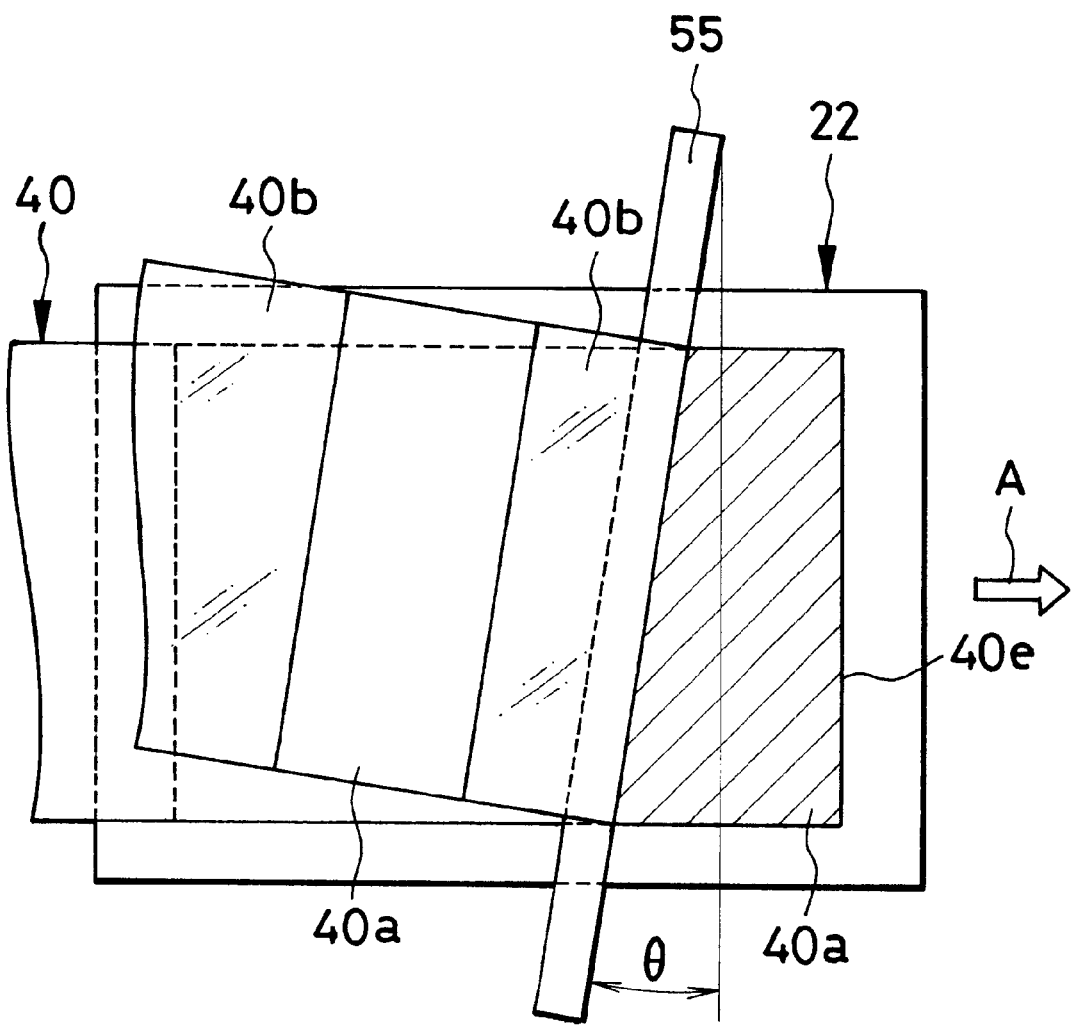
FIG. 4 is a plan illustrating a relationship in the peeler between the laminated material and a guide roller.

In the peeler 16, the guide roller 55 peels the support 40b from the glass substrate 22. The guide roller 55 can be exactly or nearly perpendicular to the feeding of the support 40b. In FIG. 4, a preferred example of the guide roller 55 is depicted, in which the guide roller 55 is oblique to the feeding of the support 40b to a small extent. A portion of starting the peeling between the support 40b and the advancing edge 40e of the transfer layer 40a becomes concentrated as one point. The peeling occurs reliably in the film width direction, so the advancing edge 40e is peeled neatly.

Also, ionization clean air is emanated by the air nozzle 59 near to the guide roller 55. This eliminates static charge from the support 40b and the glass substrate 22. Dust or other particles are prevented from sticking to the support 40b or the glass substrate 22. Partial missing of pixels can be suppressed to keep quality of the product.

The support 40b after being peeled is wound and withdrawn by the winder shaft 56a in a roll form, and withdrawn or discarded. Winding of the support 40b about the winder shaft 56a makes it unnecessary to package the film in a laborious manner of packaging plural sheets. There is a very small space with air remaining in the roll, to reduce a substantial volume of the film to be handled. Therefore, discarding and withdrawal of the film are facilitated.

The glass substrate 22 after removal of the support 40b in the peeler 16 is supported only along the two lateral edges because of operation of the flotation blower 60. The transfer layer 40a is not contacted while the glass substrate 22 is supported. The ejection robot hand 62 places the glass substrate 22 on the inside of the withdrawing cassette 65 as illustrated in FIG. 1. Although the transfer layer 40a of the glass substrate 22 is directed downwards in the position of the flotation blower 60, the ejection robot hand 62 sucking the glass substrate 22 is swung to turn over the glass substrate 22, so the transfer layer 40a becomes directed upwards before insertion of the glass substrate 22 into the withdrawing cassette 65.

The glass substrate 22 after transferring the transfer layer 40a for the red (R) filter is sent to an exposure device. The exposure device, by utilizing a photo mask, exposes a pattern of the R filter to the red photosensitive layer. After the exposure, the glass substrate 22 is processed by a developer or photographic processing machine. The glass substrate 22 after the processing is inserted in the supply cassette 23. Then the laminator of the present embodiment is used to transfer the green (G) photosensitive layer to the glass substrate. A pattern for the green (G) filter is exposed, and processed to create the green filter on the glass substrate. Similarly, the blue (B) filter is created on the glass substrate. Then a black (BK) photosensitive layer is transferred to a glass substrate. A black matrix pattern for the black (BK) filter is exposed, and processed to create a black matrix on the glass substrate.

In the above embodiment, the guide roller 55 is used. However, other peeling techniques may be used. For example, air with high pressure may be blown to a position between the glass substrate 22 and the laminated material 40. Also, a roll or bar may be attached to a distal end of an air cylinder or the like, and operate to push the laminated material 40 in a peeling direction. Furthermore, an end of the guide roller 55 or a peeling bar may be disposed in a rotatable manner, to rotate the guide roller 55 or the peeling edge in a manner to follow movement of the support 40b. Also, the peeler 16 may have a feeding belt or press roller. The feeding belt may suck the top surface of the glass substrate 22 and advance the glass substrate 22. The press roller may press the top surface of the glass substrate 22 and advance the glass substrate 22. This is effective in suppressing abnormality in movement of the glass substrate 22 at the time of peeling.

Also, the laminated material may be automatically supplied by exchanging the roll. A withdrawing shaft for the support may be provided with a roll exchanging mechanism, to exchange the roll automatically.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A laminator for lamination to a substrate by use of continuous laminated material, said laminated material including a support, and a transfer layer overlaid on said support, said laminator comprising:
   a heat/pressure roller for attaching said laminated material to said substrate with heat and pressure with said transfer layer opposed to said substrate;
   a cooler for cooling said substrate with said laminated material;
   a peeler for peeling said support from said transfer layer on said substrate from said cooler, to transfer said transfer layer to said substrate; and
   a half cutter, disposed upstream from said heat/pressure roller with reference to feeding of said laminated material, for cutting said transfer layer in said laminated material at a pitch associated with substantially a size of said substrate with said support uncut.

2. A laminator as defined in claim 1, wherein said transfer layer is photosensitive.

3. A laminator as defined in claim 1, wherein said cooler includes a cooling fan or blower for blowing cooling gas over said substrate after attachment of said laminated material.

4. A laminator as defined in claim 3, wherein said peeler transfers said transfer layer by separating said support along a predetermined peeling line from said transfer layer, and said peeling line is in a width direction of said substrate, or has an inclination to said width direction.

5. A laminator as defined in claim 1, further comprising:
   a supplier for moving and supplying said substrate to said heat/pressure roller;
   a substrate/material feeder for moving said substrate and said laminated material from said heat/pressure roller to said peeler while said cooler operates; and
   an ejector for moving and ejecting said substrate from said peeler after laminating said transfer layer.

6. A laminator as defined in claim 5, wherein said peeler includes:
   a guide roller being rotatable, having a rotational axis extending in parallel with said peeling line, for contacting said support; and
   a winder for winding said support bent on said guide roller away from said substrate, to separate said support from said transfer layer.

7. A laminator for lamination to a substrate by use of continuous laminated material, said laminated material including a support, and a transfer layer overlaid on said support, said laminator comprising:
   a heat/pressure roller for attaching said laminated material to said substrate with heat and pressure with said transfer layer opposed to said substrate;
   a cooler for cooling said substrate with said laminated material;
   a peeler for peeling said support from said transfer layer on said substrate from said cooler, to transfer said transfer layer to said substrate;
   a supplier for moving and supplying said substrate to said heat/pressure roller;
   a substrate/material feeder for moving said substrate and said laminated material from said heat/pressure roller to said peeler while said cooler operates; and
   an ejector for moving and ejecting said substrate from said peeler after laminating said transfer layer;
   wherein each of said supplier and said ejector includes:
   an advancing mechanism, operable in contact with said substrate at least partially, for advancing said substrate; and
   a flotation blower for blowing gas over a lower surface of said substrate advanced by said advancing mechanism, to prevent said substrate on said advancing mechanism from flexing downwards.

8. A laminator as defined in claim 7, wherein said advancing mechanism includes plural advancing rollers, arranged in a direction of advancing said substrate, having rotational axes that are substantially parallel with one another, for being actuated in contact with said lower surface of said substrate.

9. A laminator as defined in claim 8, wherein said substrate/material feeder supports said laminated material and said substrate upwards in feeding, and said cooler blows said gas over an upper surface of said substrate.

10. A laminator as defined in claim 9, further comprising a withdrawing cassette for withdrawing said substrate from said ejector after laminating said transfer layer.

11. A laminator as defined in claim 10, wherein said laminated material is oriented to direct said transfer layer upwards, and is attached to said lower surface of said substrate.

12. A laminator as defined in claim 11, wherein said ejector further includes a transfer mechanism for transferring said substrate from said advancing mechanism to said withdrawing cassette;
   wherein said advancing mechanism and said transfer mechanism contact lateral edge portions of said lower surface of said substrate, said upper surface, or lateral surfaces or an end surface of said substrate.

13. A laminator as defined in claim 12, further comprising a preheater for preheating said substrate while said substrate is moved by said supplier.

14. A laminator for lamination to a substrate by use of continuous laminated material including a support, and a transfer layer overlaid on said support, said laminator comprising:
   a heat/pressure roller for attaching said laminated material to said substrate with heat and pressure with said transfer layer opposed to said substrate;
   a cooler for cooling said substrate with said laminated material; and
   a peeler for peeling said support from said transfer layer on said substrate from said cooler, to transfer said transfer layer to said substrate, wherein said peeler transfers said transfer layer by separating said support along a predetermined peeling line from said transfer layer, and said peeling line has an inclination to width direction of said substrate.

* * * * *